Figure 1:
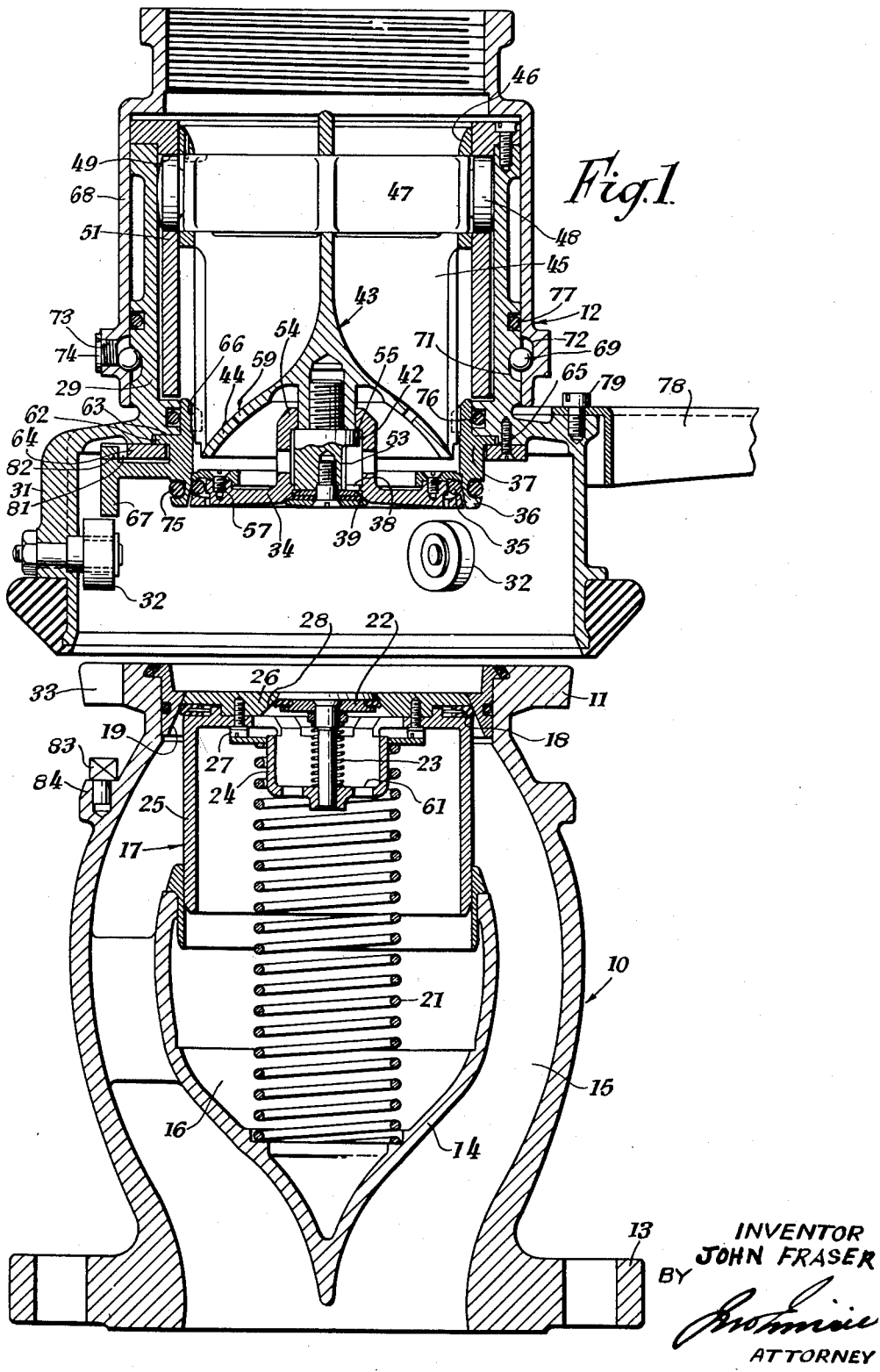

Jan. 3, 1956   J. FRASER   2,729,471
VALVED COUPLING DEVICES FOR PIPES OR CONDUITS
Filed Aug. 28, 1952   2 Sheets-Sheet 1

INVENTOR
JOHN FRASER
BY
ATTORNEY

Jan. 3, 1956  J. FRASER  2,729,471
VALVED COUPLING DEVICES FOR PIPES OR CONDUITS
Filed Aug. 28, 1952  2 Sheets-Sheet 2

INVENTOR
JOHN FRASER
BY
ATTORNEY ns # United States Patent Office 2,729,471
Patented Jan. 3, 1956

2,729,471

VALVED COUPLING DEVICES FOR PIPES OR CONDUITS

John Fraser, Tolworth, Surbiton, England, assignor to Avery-Hardoll Limited, Tolworth, Surbiton, England Application August 28, 1952, Serial No. 306,859

Claims priority, application Great Britain September 24, 1951

1 Claim. (Cl. 284—18)

This invention relates to coupling devices for pipes or conduits, of the kind in which first and second coupling parts are provided respectively with first and second valve members which close the passages through the respective coupling parts when those parts are separated, the valve members, when they are closed and the parts are brought together for coupling, being substantially in contact with each other, so that there is no considerable space between them; and in which the connecting together of the coupling parts, and the opening of the valve members, can be effected in a continuous operation.

In order that such coupling devices shall be quick-acting, it is desirable that the opening and the closing of the valves shall be effected by a short simple movement, such as a partial rotation of one coupling part relative to the other, as in the coupling devices described in our prior patent applications Nos. 20,129/49 and 12,796/50. Such short movements, however, limit the mechanical advantage which can be provided between the external operating member and the valves, and the effort required to open the valves of couplings for conduits of large diameters such as four inches, becomes prohibitively high if fluid is being passed through the conduits at high pressure.

The object of the present invention is to provide a coupling device of the kind referred to, in which the valve members are easily and quickly openable against substantial internal pressures without excessive effort on the part of the operator.

According to the present invention, in a coupling device of the kind referred to in which the valve members move axially together as one relative to the coupling parts during their opening movement, the first valve member being opened by the second, an opening force is applied to the said second valve member through a part having a limited lost motion with respect to said valve member, said part being arranged to open, during such lost motion, pilot valve means providing communication between the interior of the second coupling part and a chamber in the first coupling part in which the first valve member is slidable, the said chamber having a restricted communication with the interior of the first coupling part.

Further according to the invention, in a coupling device of the kind referred to the first valve member is spring-urged towards its seat, and is exposed on its inner side only to the pressure in a chamber having a restricted communication with the interior of the first coupling part, the said first valve member being opened by the second valve member so that the two move axially as one relative to the coupling parts, and the second valve member being opened by a force applied through a part having lost motion with respect to said second valve member and acting, during such lost motion, to open pilot valve means connecting the chamber to the interior of the second coupling part.

The valve members are preferably opened by rotary movement of a handle, such movement being conveniently converted into axial movement of the valves by cam and follower mechanism as in the couplings described in our prior patent applications above referred to. The same rotary movement is preferably used to interengage the two coupling halves.

The invention is hereinafter described with reference to the accompanying drawings which show, by way of example, a coupling device according to the invention for conduits of four inches diameter, the valves of which are capable of being opened with a fluid pressure in the conduits in excess of two hundred pounds per square inch.

Figure 2:
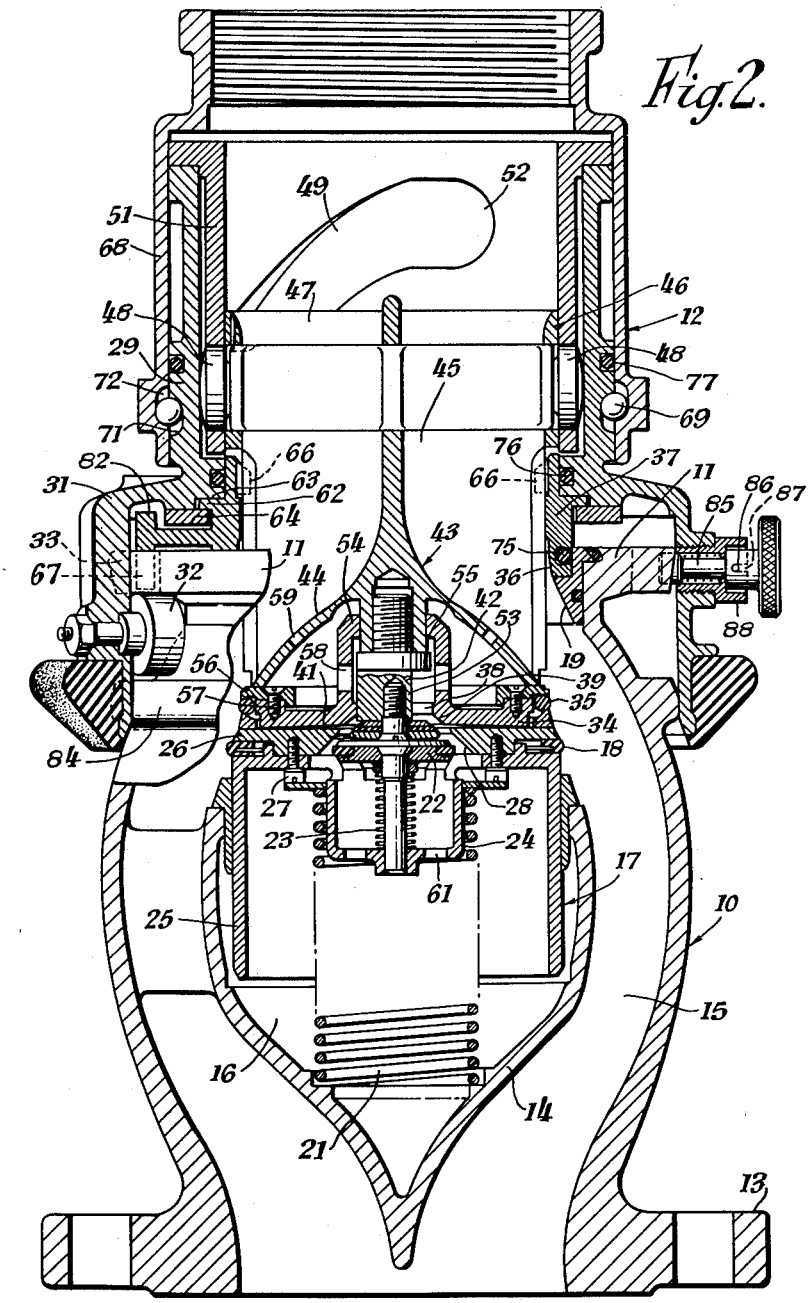

In the drawings:

Figure 1 is a longitudinal section through the two coupling parts, the said parts being separated and the valves closed; and Figure 2 is a section similar to Figure 1, but with the coupling parts mated and the valves open.

Referring to the drawings, the first coupling part 10 is of somewhat bulbous shape, having an external flange 11 at its end which mates with the second coupling part 12, and a second flange 13 at its other end for attachment purposes. An inner body 14 defines the inner wall of an annular passage 15 of substantially uniform cross-sectional area through the coupling part, and also defines a cup-shaped chamber 16 open towards the mating end of the coupling part, in which is slidably mounted a first valve member 17, which is also cup-shaped, its open end being towards the chamber 16. The valve member 17 carries a packing ring 18 which seats on an inwardly divergent seating surface 19 surrounding the orifice in the mating end of the coupling part, and the valve member 17 is urged towards this seat by a spring 21. Thus the inner side of the valve member 17, that is the side facing the interior of the coupling part 10, is exposed to the chamber 16, and not to the passage 15 through the coupling part. The fit of the valve member 17 in the chamber 16 is such as to allow relative slow leakage of fluid into and out of the chamber 16, and an inwardly opening poppet valve 22 in the centre of the first valve member 17, which poppet valve 22 is resiliently urged towards the closed position provides, when open, a passage through the said valve member which is less restricted than the leakage path into the chamber.

The poppet valve 22 is urged towards its closed position by a spring 23 taking its abutment on the base of a cup-shaped re-entrant portion 24 of the closed end of the valve member 17, which portion 24 also provides a guide for the poppet valve. The valve member 17 is formed in two parts 25 and 26 secured together by set screws 27, the packing ring 18 being clamped between the said parts, and the part 26 having a central orifice 28 with a chamfered edge providing a seat for the poppet valve 22.

The second coupling part 12 comprises a sleeve 29 one end of which is enlarged at 31 to pass over the flange 11 at the mating end of the first coupling part 10, the enlarged end 31 of the sleeve carrying internal rollers 32 which, when the coupling parts are brought together, pass through notches 33 in the flange 11 so that, when the said second coupling part 12 is turned relative to the first coupling part 10, the said rollers 32 engage the parts of the flange 11 between the notches 33 and hold the coupling parts together. A second valve member 34 of disc shape having on its edge a packing ring 35 which engages an outwardly divergent tapered seat 36 on a seat ring 37 surrounding the orifice in the mating end of the second coupling part 12, has a central opening 38 in which is formed an outwardly divergent tapered seat 39 for a relatively small poppet valve 41. The stem 42 of the poppet valve 41 passes through the second valve member 34 and is screwed into a valve opening member 43 comprising a frusto-conical shell 44 immediately behind the second valve member 34, radial wings 45 extending inwardly from the shell 44, and a skirt 46 spaced from the frusto-conical shell 44, the skirt 46 being apertured to locate a diametral bar 47 carrying rollers 48 at its ends. The rollers 48 engage in cam slots 49 in a cam sleeve 51 rigidly attached to the main sleeve 29 of the coupling part 12, the cam slots 49 being of a generally helical form with circumferential portions 52 at their ends. The poppet valve 41 and valve opening member 43 have a small axial free movement relative to the second valve member 34, the stem 42 of the poppet valve, which is formed with flats 53, being guided in a hollow boss 54 formed centrally on the second valve member 34, and the free axial movement of the poppet valve and valve opening member being limited in one direction by the end of the stem 42 engaging a shoulder 55 in the boss, and in the other direction by the shell 44 engaging the inner face of the valve member 34. The packing ring 35 is clamped between the main part of the valve member 34, and a ring 56 secured thereto by set screws 57. Radial apertures 58 are provided in the boss 54, and apertures 59 are formed in the shell 44 so that, when the poppet valve 41 is open, as shown in Figure 2, there is a passage through the valve member 34 whilst that valve member remains on its seat. Similarly the opening of the poppet valve 22 in the coupling part 10 provides a passage through openings 61 in the portion 24, through the valve member 17 into the chamber 16.

The valve seat ring 37 is free to turn in the second coupling part 12, being located axially therein by a flange 62 on the seat ring which is engaged between a shoulder 63 on the sleeve 29 and a ring 64 secured to the sleeve 29 by set screws 65. The seat ring 37 has formed on its radially inner surface pairs of lugs 66 between which are engaged the wings 45 of the valve opening member 43, so that the valve opening member turns with, but can slide axially relative to, the seat ring. The valve seat ring 37 carries a lug 67 which, when the coupling parts are brought together, enters one of the notches 33 in the flange 11 at the mating end of the first coupling part 10, so that when the second coupling part 12 is turned relative to the first the valve seat ring 37 and valve opening member 43 remain stationary, and the valve opening member 43 is moved axially by the cam and roller mechanism. The main sleeve 29 of the second coupling part 12 is rotatable in an outer sleeve 68 adapted for the connection thereto of a hose or other flexible pipe (not shown), a ring of balls 69 being located in mating grooves 71 and 72 in the two sleeves. The balls 69 are inserted through an opening 73 closed by a screwed plug 74.

A packing ring 75 is provided on the valve seat ring 37 to engage the coupling part 10 and provide a fluid tight seal between the coupling parts and a packing ring 76 is provided between the seat ring 37 and the main sleeve 29 of the coupling part 12. Another packing ring 77 is provided between the main sleeve 29 and the outer sleeve 68 of the coupling part 12.

A radially projecting handle 78 is secured by set screws, one of which is shown at 79, to the main sleeve 29 of the coupling part 12. Stops on the ring 64, one of which is shown at 81 in the drawings, co-operate with a heel 82 on the lug 67 to limit the relative angular movement of the coupling parts. Members 83 mounted on an intermediate flange 84 on the coupling part 10 are formed with inclined surfaces constituting ramps engaged by the rollers 32 when the said rollers are aligned with the notches 33 in the flange 11, the rollers striking the ramps at the end of the relative angular movement of the coupling parts during uncoupling and riding up the ramps to effect an initial axial separation of the coupling parts sufficient to break the seal between the coupling parts effected by the packing ring 75.

A spring loaded plunger 85 mounted in the enlarged portion 31 of the sleeve 29 enters one of the notches 33 in the flange 11 to lock the coupling device in the coupled position, the plunger having a cross pin 86 which, when the plunger is in its operative position, enters slots 87 in a sleeve 88 in which the plunger is mounted. The plunger can be turned through an angle when pulled out to bring the pin 86 out of register with the slots 87, the pin then engaging the end surface of the sleeve 88 to hold the plunger in the disengaged position. The plunger 85 is shown in Figure 2 in the plane of the section, but it will be understood that, as there are only three notches 33 in the flange 11 it will, in fact be in a position 60° in front of or behind the section plane.

When the coupling parts are separate, both the main valve member 17 and the poppet valve 22 in the first coupling part 10 are held closed by their springs, assisted by any fluid pressure in the conduit or vessel to which that coupling part is connected, and the main valve member 34 in the second coupling part 12 is held closed by the poppet valve 41, which is in turn held closed by the cam and roller mechanism 49, 48. When the coupling parts 10 and 12 are brought together, and the second coupling part 12 is turned to open the valves, the poppet valve 41 in the second coupling part is first opened by initial movement of the valve opening member 43, and moves with it the poppet valve 22 in the first coupling part, so that the chamber 16 in the first coupling part 10 is in free communication with the passage through the second coupling part. Continued movement of the valve opening member 43 causes it to act directly on the second valve member 34 and thus to open both valves members 34 and 17 against the spring of the first valve member 17.

Since the poppet valves 41 and 22 act as pilot valve means, and, when open, provide a passage between the chamber 16 in the first coupling part 10 and the passage through the second coupling part 12, which passage is relatively unrestricted as compared with the leakage path between the chamber 16 and the passage 15 through the first coupling part 10, it will be seen that, when the poppet valves are open, the first and second valve members are substantially balanced, as the pressure on both sides of them corresponds substantially to that in the second coupling part, so that the presence of high pressure in either of the coupling parts does not oppose either the opening or the closing of the valve members to any substantial degree.

Thus the manipulation of the coupling can easily be accomplished by means of the handle 78 although the hand grip thereof is set at a relatively small distance from the axis of the coupling device, and a fraction of a turn of one coupling part relative to the other is sufficient to provide complete opening of the valves.

I claim:

In a coupling device for conduits comprising first and second tubular coupling members having mutually engaged mating ends, a valve seat in the mating end of the first coupling member, a first main valve engaging said valve seat to close the passage through said first coupling member, a valve seat in the mating end of the second coupling member, a second main valve engaging said last mentioned valve seat to close the passage through said second coupling member, valve operating means in said second coupling member to move said second main valve outwardly to its open position, and said first main valve being opened by the opening movement of the second main valve, the provision of means in said first coupling member defining with said first main valve a chamber in which said first main valve is slidable, means defining a restricted passage connecting said chamber with the passage through the first coupling member, aligned ports in said first and second main valves to connect said chamber with the passage through the second coupling member, an outwardly opening pilot valve closing the port in the second main valve, an inwardly opening pilot valve closing the port in the first main valve and aligned with the outwardly opening pilot valve, an axially movable member forming part of the valve operating means and having lost motion relative to said second main valve, and means fixing said outwardly opening pilot valve to said axially movable member, said axially movable member moving said outwardly opening pilot valve outwardly while taking up the lost motion between itself and the second main valve preparatory to opening said second main valve and said outwardly opening pilot valve engaging and opening said inwardly facing pilot valve whereby the said chamber is connected to the pasage through the second coupling member before the main valves are opened.

References Cited in the file of this patent

UNITED STATES PATENTS

| | | |
|---|---|---|
| 884,946 | Lowe | Feb. 19, 1907 |
| 2,417,483 | Geiger et al. | Mar. 18, 1947 |
| 2,471,798 | Thomas | May 31, 1949 |
| 2,519,358 | Davies | Aug. 22, 1950 |
| 2,543,590 | Swank | Feb. 27, 1951 |

FOREIGN PATENTS

| | | |
|---|---|---|
| 352,778 | Germany | May 4, 1922 |